(12) United States Patent
Kies

(10) Patent No.: US 11,111,049 B2
(45) Date of Patent: Sep. 7, 2021

(54) PLASTIC CONTAINER PRODUCED IN AN EXTRUSION BLOW MOLDING METHOD, IN PARTICULAR PLASTIC BOTTLE

(71) Applicant: ALPLA Werke Alwin Lehner GmbH & Co. KG, Hard (AU)

(72) Inventor: Oliver Kies, Hard (AU)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 12 days.

(21) Appl. No.: 14/615,983

(22) Filed: Feb. 6, 2015

(65) Prior Publication Data
US 2015/0217894 A1    Aug. 6, 2015

(30) Foreign Application Priority Data

Feb. 6, 2014    (CH) .................................... 00163/14
Jul. 23, 2014   (CH) .................................... 01127/14

(51) Int. Cl.
| | | |
|---|---|---|
| B65D 1/40 | (2006.01) | |
| B65D 79/00 | (2006.01) | |
| B29C 48/00 | (2019.01) | |
| B65D 1/02 | (2006.01) | |

(52) U.S. Cl.
CPC ........ B65D 1/0215 (2013.01); B29C 48/0017 (2019.02); B65D 1/0223 (2013.01); B65D 1/40 (2013.01); B65D 79/005 (2013.01); B65D 2501/0081 (2013.01)

(58) Field of Classification Search
CPC ...... B65D 1/40; B65D 79/005; B65D 1/0276; B65D 1/0215; B65D 1/26; B65D 1/32

USPC ...................... 215/12.1, 379; 220/62.22, 675
See application file for complete search history.

(56) References Cited

U.S. PATENT DOCUMENTS

| | | | | |
|---|---|---|---|---|
| RE32,929 E | * | 5/1989 | Ewing | C09J 7/0275 206/460 |
| 5,174,458 A | * | 12/1992 | Segati | B65D 1/0292 215/383 |
| 5,255,808 A | * | 10/1993 | Tobler | B65D 1/0292 206/218 |
| 5,484,083 A | * | 1/1996 | Joulia | B05B 11/0024 222/107 |
| 6,158,620 A | * | 12/2000 | Polan | B65D 1/0292 222/107 |
| 8,061,550 B2 | * | 11/2011 | Browne | B60R 7/043 220/666 |
| 9,067,709 B2 | * | 6/2015 | Furusawa | B29C 49/22 |

(Continued)

*Primary Examiner* — Anthony D Stashick
*Assistant Examiner* — Raven Collins
(74) *Attorney, Agent, or Firm* — Buchanan Ingersoll & Rooney PC

(57) ABSTRACT

An extrusion blow-molded plastic container, for example, a plastic bottle, is described which has a container body having a longitudinal axis, a longitudinal end sealed by a container bottom, another longitudinal end adjoining a container neck provided with a pour opening, and a container shoulder. The container body has at least one deformable section which is made flat and which extends over a large part of an axial length of the container body and in the peripheral direction. The deformable section which has been made flat has two longitudinal sides which run essentially in the axial direction and which border regions of the container body which have a greater stiffness than the deformable section.

17 Claims, 2 Drawing Sheets

(56) References Cited

U.S. PATENT DOCUMENTS

| | | | | |
|---|---|---|---|---|
| 9,079,685 B2* | 7/2015 | Sudakoff | ............... | B65D 21/086 |
| 9,289,045 B2* | 3/2016 | Akinbobola | .............. | A61K 8/22 |
| 2002/0005410 A1* | 1/2002 | Uchiyama | ............ | B65D 1/0223 |
| | | | | 220/669 |
| 2014/0339242 A1* | 11/2014 | Feldmann | ................ | B65D 3/08 |
| | | | | 220/666 |
| 2015/0203253 A1* | 7/2015 | Lee | ...................... | B65D 1/0223 |
| | | | | 222/214 |

* cited by examiner

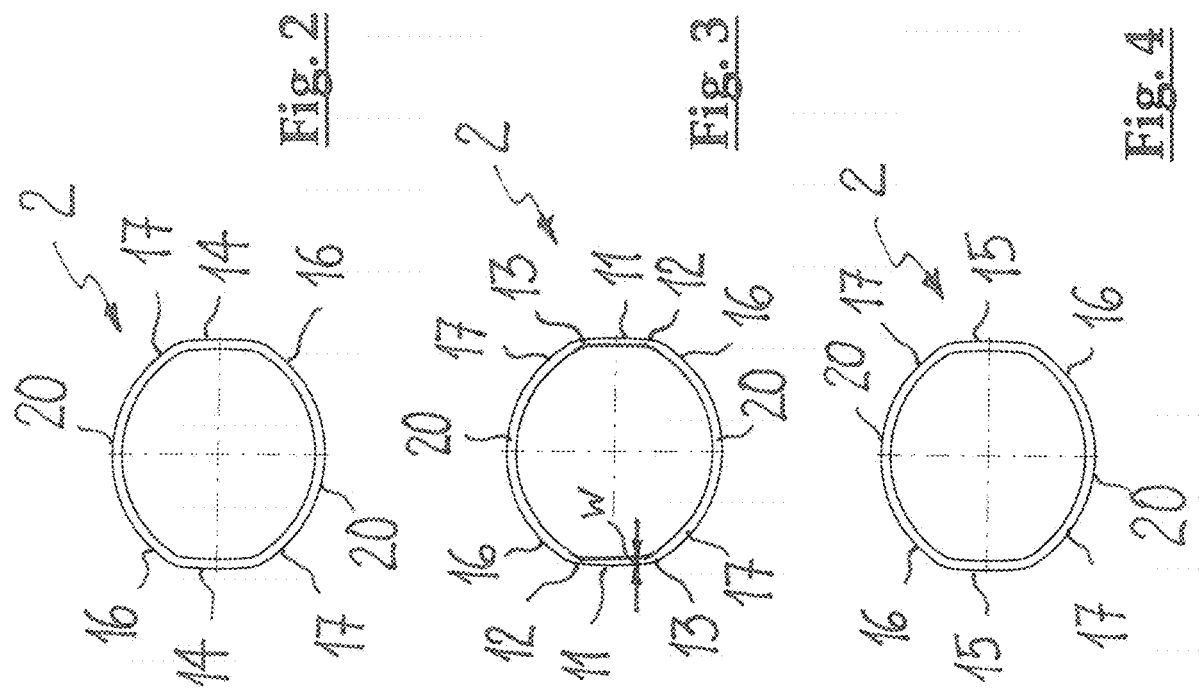
Fig. 2
Fig. 3
Fig. 4
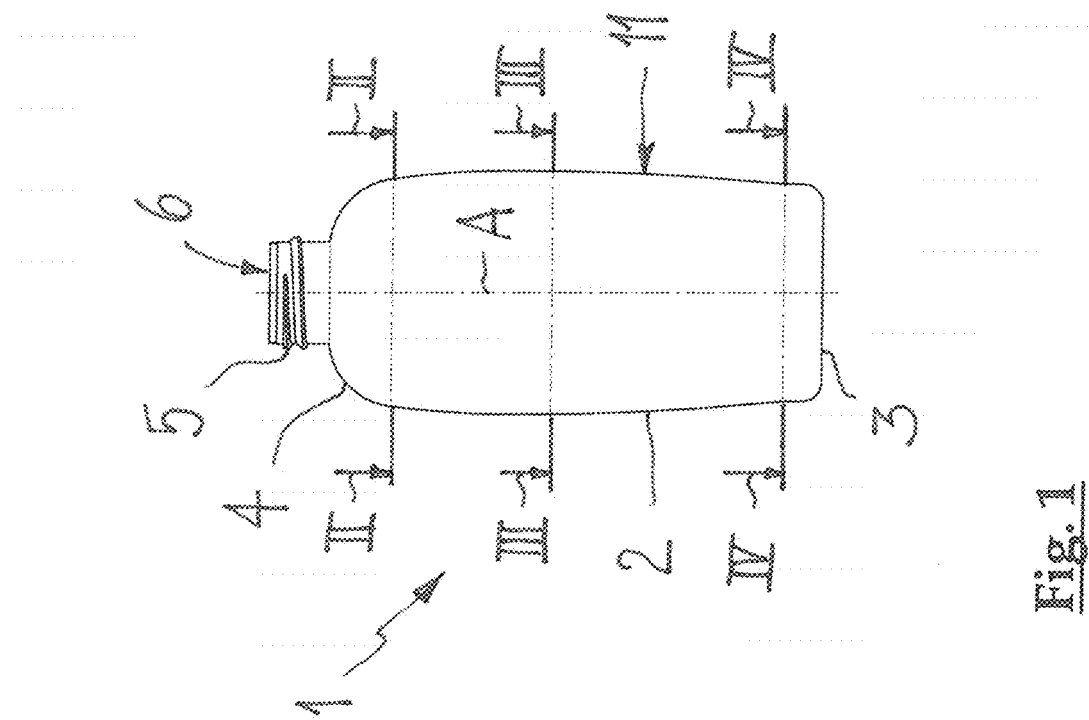
Fig. 1

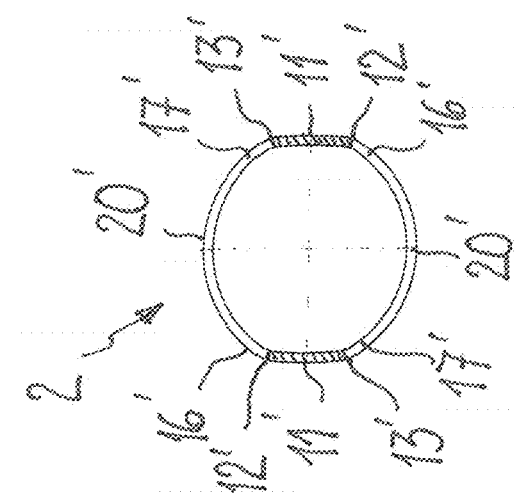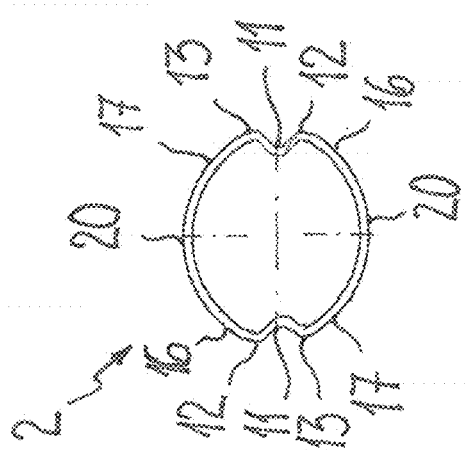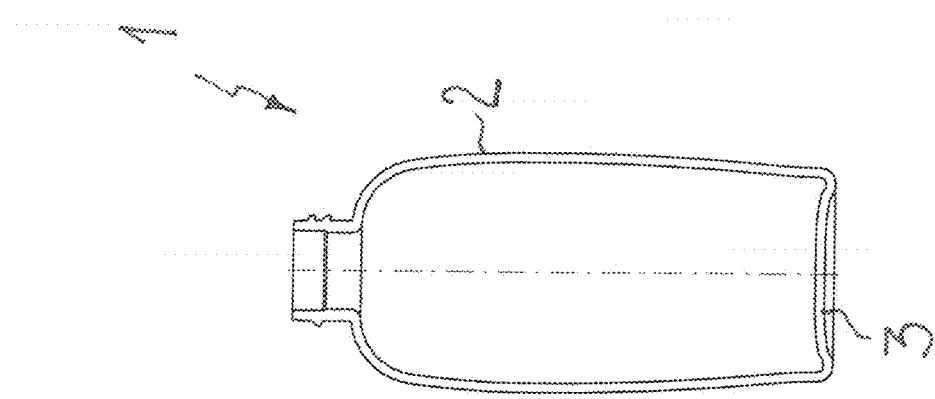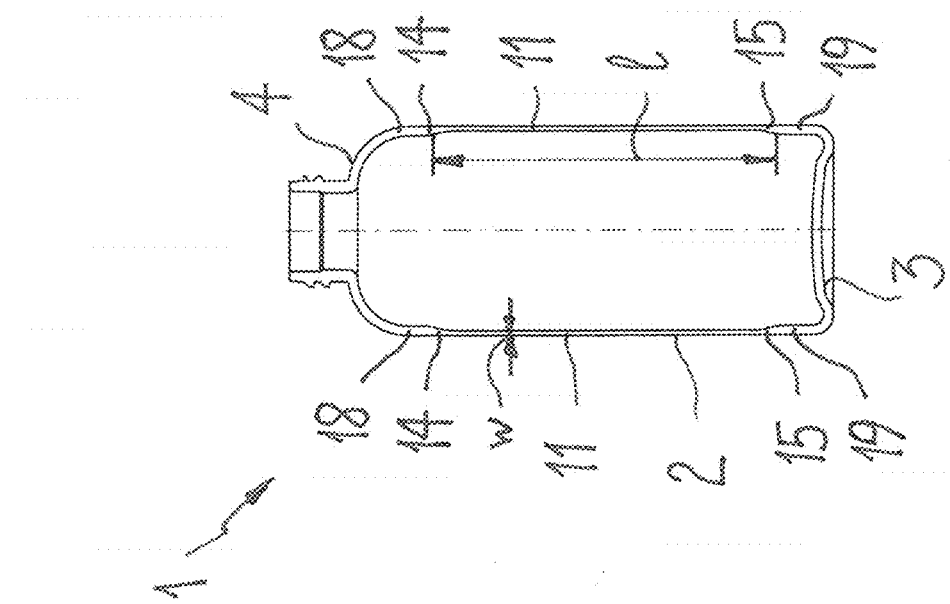

PLASTIC CONTAINER PRODUCED IN AN EXTRUSION BLOW MOLDING METHOD, IN PARTICULAR PLASTIC BOTTLE

RELATED APPLICATION(S)

This application claims priority under 35 U.S.C. § 119 to Swiss Patent Application Nos. 0163/14 filed in Switzerland on Feb. 6, 2014, and 01127/14 on Jul. 23, 2014. The entire contents of these applications are hereby incorporated by reference in their entireties.

FIELD

The disclosure relates to a plastic container produced in an extrusion blow molding method, for example, a plastic bottle.

BACKGROUND INFORMATION

The containers which were known in the past, of tin sheet or nonferrous metal sheet, of glass or also of ceramic, are being increasingly displaced by plastic containers. Recently plastic containers have been used, for example, for packaging of fluid substances for applications in the household, in agriculture, industry and trade, etc. Low weight and lower costs, however, play a major part in this substitution. The use of recyclable plastic materials and the altogether more favorable overall energy balance in their production also contribute to promoting the acceptance of plastic containers among users.

Single-layer or multilayer plastic containers can be produced in the so-called extrusion blow molding method, especially an extruded tube blowing method. The extrusion blow molding machines, which are used for the extrusion blow molding method, can have one or more extruders to supply the required plastic material. The output of the extruder is connected to an extruder head, at whose outlet nozzle, which can be adjusted preferably in an opening width, the extruded tubing emerges. The extruded plastic tubing can have a single-layer or multilayer structure. The tubing which emerges continuously or quasi-continuously from the outlet nozzle is transferred to a blow molding tool arrangement and using a blowing mandrel which has been inserted into the mold cavity is inflated by overpressure. Afterwards the inflated plastic container is removed from the mold cavity.

Depending on the purpose a plastic container, especially a plastic bottle, is intended, it can be more or less completely filled by a bottler. In certain applications it can happen, for example, that the plastic container is only half filled. As a result of the relatively large empty volume, under special conditions it can occur that within the container a vacuum forms which can lead to the plastic container deforming. These special conditions prevail, for example, in the filling and in the sale of plastic containers at different altitudes above sea level. Thus it can happen that plastic bottles which have been filled, for example, at the altitudes of Mexico and which are then transported and marketed on the coast, due to the greater air pressure prevailing on the coast, can deform uncontrollably. The risk of deformation is especially great in plastic bottles with an elongated shape. Often deformations, especially indentations, occur due to the pressure difference in the central region of the axial extension of these plastic bottles. The deformation of the plastic container does not have any effect on the quality of the contents. But the uncontrolled deformations can be a problem for the application of labels or decorations. Moreover plastic containers which have deformed in an uncontrolled manner have an unaesthetic appearance.

For plastic containers in which the contents, for example, for reasons of sterility or in order to improve flow properties, are filled hot or at least warm, deformation problems can also occur. Immediately after filling with hot or warm contents, the plastic containers are sealed tight and the contents cool. In only partially filled plastic containers with a relatively large empty volume above the level of the contents, the vacuum which arises in the interior during cooling can lead to uncontrolled deformation of the container body over its axial extension, especially to an indentation. The deformation is a result of the pressure difference between the atmospheric pressure, which is acting from the outside on the container walls, and the negative pressure which can arise in the interior as a result of cooling. Thus, shortly after filling with the contents and airtight sealing of the plastic container, an overpressure above the level of the contents in the container can occur, for example, by the evaporation of the liquid, by outgassing of the product or by an elevated temperature of the contents. By cooling the contents, a negative pressure forms in the container because the gases above the level of the contents and the contents themselves change their volume by the temperature difference. In particular, the volume can be reduced. Another reason for the formation of a negative pressure can be that a part of the gas contained above the level of the contents dissolves in the contents or reacts chemically with them. It can also happen that during storage certain ingredients leave the container as a result of diffusion processes through the container wall and in this way produce a negative pressure. Thus, for example, the loss of water in PET packing drums after one year can distinctly exceed one percent. In other materials, such as for example, the bioplastics which have been used recently, water loss in the indicated magnitude can occur even after a shorter time.

This tendency to deformation of plastic containers, especially plastic bottles, which have been filled warm or hot at different altitudes above sea level can be counteracted by a generally greater wall thickness of the plastic containers. But the production of these plastic containers becomes more expensive due to the increased material demand and their weight rises.

SUMMARY

An extrusion blow-molded plastic container is disclosed, comprising: a container body having a longitudinal axis; a longitudinal end sealed by a container bottom; another longitudinal end adjoining a container neck provided with a pour opening; a container shoulder; and at least one flat deformable section extending over a large part of an axial length of the container body and in a peripheral direction, the flat deformable section having two longitudinal sides which run essentially in the axial direction and bordering regions of the container body which have a greater stiffness than the deformable section.

BRIEF DESCRIPTION OF THE DRAWINGS

Other advantages and features will become apparent from the following description of exemplary embodiments of the disclosure with reference to the schematics drawings which are not to scale.

FIG. 1 shows a side view of the plastic container according to an exemplary embodiment of the disclosure;

FIG. 2 shows a cross section which runs perpendicular to one longitudinal axis of the plastic container according to cutting line II-II in FIG. 1;

FIG. 3 shows a cross section which runs perpendicular to one longitudinal axis of the plastic container according to cutting line III-Ill in FIG. 1;

FIG. 4 shows a cross section which runs perpendicular to one longitudinal axis of the plastic container according to cutting line IV-IV in FIG. 1;

FIG. 5 shows an axial section of the plastic container according to FIG. 1;

FIG. 6 shows an axial section of the plastic container according to FIG. 1 turned by 90° relative to FIG. 5;

FIG. 7 shows a cross section of an exemplary embodiment of the plastic container according to the disclosure analogously to FIG. 3; and FIG. 8 shows a cross section of a plastic container according to an exemplary embodiment of the disclosure which has been deformed in a controlled manner.

In the figures the same components or parts are each provided with the same reference numbers.

DETAILED DESCRIPTION

Exemplary embodiments of the disclosure can address the issues of known plastic containers. A plastic container, for example, a plastic bottle can be modified as disclosed herein such that pressure differences as a result of hot filling or of level differences in the filling and sale of filled plastic containers can be equalized in a controlled manner. This controlled equalization of deformation tendencies can also be helpful especially in only partially filled plastic containers. Here the area intended for labelling or for decoration of the plastic container will be preserved. It will be possible to produce the plastic container in the known manner in an extrusion blow molding method without greater process engineering modifications or hardware modifications.

These and other objects can be achieved in a plastic container, for example, a plastic bottle according to an exemplary embodiment of the disclosure.

Exemplary embodiments of the disclosure relate to an extrusion blow molded plastic container, for example, a plastic bottle, which has a container body which has a longitudinal axis, whose one longitudinal end is sealed by a container bottom and whose other longitudinal end adjoins a container neck which is provided with a pour opening, with the formation of one container shoulder. The container body can have at least one deformable section which is made flat and which extends over a large part of an axial length of the container body and in the peripheral direction. The deformable section which has been made flat can have two longitudinal sides which run essentially in the axial direction and which border regions of the container body which have a greater stiffness than the deformable section.

The container body can have at least one deformable section which is made like a membrane and on its two longitudinal sides and is fixed in the manner of a frame. The deformable section of the container body represents a geometrically clearly defined weakening region of the plastic container. For this reason the container body can deform, especially indent, as a result of the overpressure acting from the outside or when a vacuum builds up in its interior, in a controlled manner in the weakened region. The fixing of the deformable section on its longitudinal sides can be sufficient because the container body at the transition to the container bottom and on the container shoulder as already disclosed, can have a greater stiffness than the deformable section.

Because the deformable section can extend over most of the axial length of the container body and in the peripheral direction, the deformation per unit of length can be relatively small and can hardly be perceptible to the viewer. When a label is suitably attached the deformation can remain essentially invisible. The remainder of the container body can be made in a known manner and is generally not affected by any deformation.

The plastic container can also be made such that the deformable section is made on one narrow side of the container body. The entire narrow side can also be made as a deformable section. One front side of the container body which borders the narrow side can be made as label carrier. Furthermore the container body can be configured such that in examining the front side, or the label, the narrow side can be almost imperceptible to the viewer. Thus, for example, the front side can remain undeformed in the deformation of the deformable section on the narrow side. The desired non-deformation of the front side can be supported by the longitudinal sides being made at least partially as a predetermined buckling region. The predetermined buckling region can have a first edge which borders the deformable section in axial length and a second edge which borders the front side in axial length, the first edge extending offset relative to the second edge in the direction of a container interior. Thus the first edge and the second edge in the predetermined buckling region can form an undercut region.

An exemplary embodiment of the disclosure can provide for the container body to have an unstructured outer surface. The term "unstructured" here means that the outer surface of the container body is free of grooves, ribs, impressions, nubs and similar geometric formations which interrupt the uniformity of the outer surface. The frame-like fixing of the deformable section may not be detectable in its outer surface. Its unstructured outer surface can make the entire container body available for labeling. This can be a great advantage with the increasing demands on product information.

In an exemplary embodiment of the disclosure, two wide sides of the deformable section which run essentially perpendicular to the axial extension of the container body in the peripheral direction, also border defined regions of the container body which have a greater stiffness than the deformable section. The extension of the deformable section in length and width can be more precisely defined by the deformable section which has been made flat being fixed in the manner of a membrane on all four bordering sides, especially on its two axially running longitudinal sides and on its two wide sides which run in the peripheral direction. Of course the wide sides of the deformable section can likewise be made as predetermined buckling regions analogously to the above described longitudinal sides.

An exemplary embodiment of the disclosure calls for the regions of the container body, which border the longitudinal sides and wide sides of the at least one deformable section which has been made flat, to have a plastic material composition which is different from the plastic material of the deformable section. This version relates both to plastic containers with a single-layer and also multilayer structure. While the deformable section includes a soft plastic material or can have a soft structure of several layers of plastic materials, at least the regions bordering the longitudinal sides of the deformable section include a conversely distinctly stiffer layer sequence. For example, the deformable section can include LDPE or of a soft polyolefin, including mixtures of them, while the bordering regions which form the fixing frame can include HDPE or of a polyolefin composition with greater stiffness.

Exemplary embodiments of the disclosure can provide for at least one of the regions of the container body which border the longitudinal sides of the deformable section to be made as an inspection strip. This version can be of interest especially for non-transparent container bodies because the inspection strip enables simple visual monitoring of the level of the contents.

Materials for the region of the container body made as an inspection strip can be, for example, undyed or only translucently dyed polyolefins such as, for example, HDPE, LDPE or LLDPE and mixtures of these materials. If the plastic container is made of PP, the inspection strip can also be made in PP. They have on the one hand the required greater stiffness and on the other possess the necessary transparency.

In the case of forming the regions of the container body, which border the longitudinal sides and wide sides of at least one deformable section, from a stiffer plastic composition which is different from the material of the deformable section, the at least one deformable section and the regions of the container body which border the longitudinal sides and wide sides of the deformable section can have essentially the same wall thicknesses. This simplifies the process of extrusion of the plastic tubing which precedes the inflation process, out of which tubing the plastic container is inflated.

In an exemplary embodiment of the plastic container of the disclosure, the at least one deformable section which is made flat, can have an average wall thickness which is smaller than the wall thickness of the regions of the plastic container which border the longitudinal sides and wide sides of the deformable section. Fundamentally, limiting the wall thickness of the deformable section on its longitudinal sides which run essentially axially can be sufficient because the container body at the transition to the container bottom and on the container shoulder already have a greater stiffness, as dictated by the construction, than the deformable section. The deformable section can be fixed in the manner of a membrane between the regions of the container body with a greater wall thickness which border the two longitudinal sides and on its two wide sides which run in the peripheral direction it is bordered by the transition to the container bottom and to the container shoulder. It can also be provided that the deformable section, on its two longitudinal sides and on its two wide sides, borders regions of the container body which have a greater wall thickness than the average wall thickness of the deformable region. The variation of the wall thickness in the axial direction can be achieved in the extrusion of the plastic tubing by adjusting the width of the extrusion gap. The variation of the wall thickness in the peripheral direction can be achieved for example by a deformation of the extrusion nozzle in the extrusion of the plastic tubing.

In an exemplary embodiment according to the disclosure, the at least one deformable section can have a wall thickness which tapers steadily from a maximum wall thickness on its two axial longitudinal sides in the direction of a middle section of the deformable section, but does not fall below a minimum wall thickness of 0.02 mm, for example, 0.05 mm.

In an exemplary embodiment of the disclosure, the at least one deformable section can have a wall thickness which tapers steadily in the axial direction from a maximum wall thickness on the wide sides which run in the peripheral direction, but does not fall below a minimum wall thickness of 0.02 mm, for example, 0.05 mm.

In order to obtain controlled deformation to the desired extent, the at least one deformable section should have a peripheral extension over the container body which is roughly 10° to roughly 170°. Here the deformable section should extend over roughly 30% to roughly 95% of the axial length of the container body.

In an exemplary embodiment of the plastic container according to the disclosure having on the container body two deformable sections which are made flat and which are arranged in the container body essentially symmetrically to one another, any deformation can be distributed among two deformable sections so that one deformable section can be deformed essentially only by half in the direction of the container interior. Thus, the load on the regions of the container body which border the deformable sections can essentially be reduced likewise by half. Thus, at this point, due to the reduction of the load the remaining container body can be made weaker. This can lead to a saving of material.

In an exemplary embodiment of the disclosure the container body can have a cross section which differs from circular. In such a non-round configuration the deformable sections which have been fixed in the manner of a membrane can especially easily perform their functions. The plastic container can have a container body with a cross sectional shape which differs from circular but the container body has 180° rotational symmetry. This facilitates further handling of the plastic container, for example, the labelling.

In an exemplary embodiment of the plastic container according to the disclosure, each deformable section can form a labelling surface and/or a decoration surface of the container body. If there is a deformable section underneath the label, a deformation can hardly be visually detected. This can also influence the purchase behavior of a potential customer.

Depending on the requirements, the plastic containers provided according to one of the preceding exemplary embodiments with at least one deformable section can be made with multiple layers. For example it can be made for partial filling with an alcohol-based solvent.

A plastic container according to an exemplary embodiment of the disclosure which is shown in a side view in FIG. 1, for example, a plastic bottle, is labelled with reference number 1 overall. It can have an elongated container body 2 with one longitudinal axis A whose one longitudinal end is closed with a container bottom 3. The container bottom 3 can moreover be used as a standing surface for the plastic container 1. The other end of the container body 2 is adjoined by a container shoulder 4 which passes into a container neck 5 with a pour opening 6. The plastic container 1 can be produced in an extrusion blow molding method in which a piece of plastic tubing which has been extruded in one layer or multiple layers is inflated in a mold cavity of a blow molding tool arrangement by a blowing medium which is delivered with an overpressure, generally air, according to the mold cavity, and afterwards is removed from the mold. Extrusion blow molding methods are known so that a more detailed description of the method can be omitted here.

One outer surface of the container body 2 can be made uniform and unstructured. The container body 2 can have at least one deformable section 11 which is made flat and which extends over a large part of an axial length of the container body 2 and in the peripheral direction. Due to the outer surface which has been made uniform and unstructured, this deformable section 11 cannot be directly detected on the container body 2.

FIG. 2, FIG. 3, and FIG. 4 show cross sections of the container body 2 which run perpendicular to the longitudinal axis A and which are indicated in FIG. 1 by the cutting lines II-II, III-III, and IV-IV. The cross section which is shown in FIG. 2 runs straight through a transition of the container shoulder 4 to the container body 2. Analogously, the cross section which is shown in FIG. 4 runs straight through one transition of the container body 2 to the container bottom 3. The deformable section 11, as shown in FIG. 2, is bordered in the direction of the container shoulder 4 by a first wide side 14 and in the direction of the container bottom 3, as shown in FIG. 4, it is bordered by a second wide side 15 which is opposite the first wide side 14. As is apparent from FIG. 2 and FIG. 4, the two wide sides 14, 15 and the regions 16, 17 of the container body 2 which border the wide sides 14, 15 have roughly the same wall thicknesses. In this exemplary embodiment the regions 16, 17 are a component of the generally printed or labelled front sides 20.

FIG. 3 shows a cross section of the container body 2 according to cutting line III-III in FIG. 1. The cross section runs roughly through half the longitudinal extension of the deformable section 11. As is furthermore apparent from FIG. 3, the container body 2 can have two deformable sections 11 which are made essentially symmetrical to one another on two sides of the container body 2 which are opposite one another. The container body 2 can have a cross section which differs from circular and can have for example 180° rotational symmetry. Each deformable section 11 can have a wall thickness w which tapers, for example, steadily from a maximum value on two longitudinal sides 12, 13 which extend in the axial direction and which border in the longitudinal direction the deformable section 11 in the direction of a middle section of the deformable section 11 as far as a minimum value of 0.02 mm. The wall thickness at the transitions of the longitudinal sides 12, 13 to the bordering regions 16, 17 corresponds essentially to the wall thickness of these bordering regions 16, 17 or, as shown in this exemplary embodiment, to the wall thickness of the front sides 20. The peripheral extension of each deformable section 11 is roughly 10° to 170°.

As is apparent from FIG. 5, the regions 16 and 17 which border the longitudinal sides 12, 13 in the axial direction and the regions 18, 19 which border the wide sides 14, 15 in the peripheral direction have a greater wall thickness than the deformable region 11. For this reason, it can have a greater stiffness than the deformable sections 11 which can have the same material composition as the remaining container body 2. In this way the bordering regions 16, 17, 18, 19 each form a frame for each deformable section 11. In the case of a negative pressure within the sealed container 1, the container body 2 can deform, especially indent, in a controlled manner for pressure equalization only on the deformable sections 11. If the container 1 is viewed from the labelled or printed front side 20, the deformable sections 11 are almost invisible to the viewer. Accordingly the indentations or controlled deformations of the deformable sections 11 are hardly perceived or not at all by the viewer. In an exemplary embodiment, the deformable sections can be covered for example by a label. This can result in the deformation being essentially likewise undetectable from the outside.

FIG. 5 shows an axial section of the plastic container 1 from FIG. 1. The two deformable sections which are essentially opposite one another are in turn labelled 11. The regions bordering the wide sides 14, 15 of the deformable sections 11 in the axial direction are labelled 18 and 19. Each deformable section 11 extends over a large part of one axial length of the container body 2 and can have an axial extension I which is roughly 15-95% of the axial length of the container body 2. The wall thickness w of the deformable section 11 tapers, for example, steadily from a greatest wall thickness at the transitions of the wide sides 14, 15 to the bordering regions 18, 19 of the container body 2. The wall thickness does not drop below a minimum wall thickness of 0.02 mm.

The variation of the wall thickness of the exemplary embodiment of the plastic bottle in the disclosure which is shown in FIGS. 1-5 in the axial direction can be achieved in the extrusion of the plastic tubing d and the adjustment of the width of the extrusion gap. The variation of the wall thicknesses in the peripheral direction can be achieved, for example, by a deformation of the extrusion nozzle in the extrusion of the plastic tubing.

FIG. 6 shows an axial section of the plastic container 1 which has been turned by 90° relative to the axial section from FIG. 5. It is apparent from the figure that the container body 2 can have an essentially constant wall thickness, aside from the deformable sections which are not visible (reference number 11 in FIGS. 1, 3 and 5).

FIG. 7 is a cross section of an exemplary embodiment of the plastic container according to the disclosure in a view which is analogous to the cross section from FIG. 3. The same components bear the same reference numbers, but are provided with an apostrophe for differentiation from the exemplary embodiment shown there. The cross section runs roughly through half the longitudinal extension of the deformable section 11'. The longitudinal sides bordering the deformable sections 11' in the peripheral direction bear reference numbers 12' and 13'. The reference numbers of the two front sides are 20'. The regions of the container body which border the longitudinal sides 12', 13' are labelled 16' and 17'. In contrast to the exemplary embodiment of the plastic bottle explained using FIG. 1 to FIG. 6, the regions 16', 17' bordering the longitudinal sides 12', 13' of the deformable sections 11' include a plastic composition which is different from the plastic material of the deformable sections 11' and which can have greater stiffness at essentially the same wall thickness. In this case the laterally bordered regions 16', 17' for the deformable sections 11' form a side frame. In the axial direction the transition to the container bottom and the transition to the container shoulder likewise form a frame-like boundary for the deformable section 11' because due to their relatively strong curvatures they have a greater stiffness than the deformable section 11' of the container body, which section is made flat, as dictated by the construction. As is apparent from the figure, the deformable sections 11' and the bordering regions 16', 17' also have essentially the same wall thicknesses. While the deformable sections 11' can include a soft plastic material and have a soft structure of several layers of plastic materials, at least the regions 16', 17' bordering the longitudinal sides 12', 13' of the deformable sections can include a conversely distinctly stiffer material or of a distinctly stiffer layer sequence. For example, the deformable section 11' can include LDPE or of a soft polyolefin, while the bordering regions 16', 17' which form the fixing frame can include HDPE or a polyolefin composition with greater stiffness. It can even be provided that at least one of the regions 15' or 16' of the container body which border the longitudinal sides of the deformable sections 11' be made as an inspection strip. Materials for the region of the container body made as an inspection strip can be, for example, undyed or only translucently dyed polyolefins such as, for example, HDPE, LDPE or LLDPE as well as mixtures of these materials. If the plastic container is made of PP, the inspection strip can also be made in PP.

FIG. 8 schematically shows the deformation of the deformable sections 11 which are shown in FIG. 3 after producing a pressure equalization between the plastic container 1 which has been sealed airtight and which has been exposed to a negative pressure, and the vicinity. On the one hand, it is apparent that the front sides 20 in their geometrical dimensions can be essentially unchanged. Conversely the deformable sections 11 can be reversibly elastically deformed in the direction of the container interior. Here the regions 16, 17 which border the longitudinal sides 12, 13 of the wide sides which are not shown act as frames which enable controlled deformation or indentation. The schematic of the deformation applies analogously also to the exemplary embodiment according to FIG. 7.

The plastic container according to exemplary embodiments in the disclosure can have a container body which can have at least one deformable section which is made membrane-like and is fixed in the manner of a frame at least on one its two longitudinal sides. The deformable section of the container body represents a geometrically clearly defined weakening region of the plastic container. For this reason the container body can deform, especially indent, as a result of the overpressure acting from the outside or when a vacuum builds up in its interior, in a controlled manner in the weakened region. The fixing of the deformable section on its longitudinal sides is generally sufficient because the container body at the transition to the container bottom and on the container shoulder as dictated by construction already can have a greater stiffness than the deformable section. Because the deformable section extends over most of the axial length of the container body and in the peripheral direction, the deformation is hardly perceptible to the user. The remaining region of the container body is made in the known manner and is generally not affected by any deformation. The container body can have a uniform, unstructured outer surface so that the fixing of the deformable section is not detectable from the outside.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An extrusion blow-molded plastic bottle, comprising:
   a container body having a longitudinal axis;
   a longitudinal end sealed by a container bottom;
   another longitudinal end which is adjoined by a container shoulder which passes into a container neck with a pour opening; and
   at least one unstructured deformable section extending over a part of an axial length of the container body parallel to the longitudinal axis and in a circumferential direction orthogonal to the longitudinal axis, the at least one unstructured deformable section having two longitudinal sides which run essentially in an axial direction and a first wide side and a second wide side which run in the circumferential direction
   wherein the at least one unstructured deformable section is bordered in a framed manner by bordering regions of the container body which have a greater stiffness than the at least one unstructured deformable section, said bordering regions being provided in the circumferential direction by laterally bordering regions of the container body to border the two longitudinal sides and in the axial direction by a transition to the container shoulder to border the first wide side and by a transition to the container bottom to border the second wide side.

2. The extrusion blow-molded plastic bottle as claimed in claim 1, wherein the regions of the container body which border the longitudinal sides and the wide sides of the at least one unstructured deformable section have a plastic material composition which is different from the plastic material of the at least one unstructured deformable section.

3. The extrusion blow-molded plastic bottle as claimed in claim 2, wherein at least one of the regions of the container body which border the longitudinal sides of the at least one unstructured deformable section is made as an inspection strip.

4. The extrusion blow-molded plastic bottle as claimed in claim 2, wherein the at least one unstructured deformable section and the regions of the container body which border the longitudinal sides and wide sides of the at least one unstructured deformable section have essentially the same wall thicknesses.

5. The extrusion blow-molded plastic bottle as claimed in claim 2, wherein the at least one unstructured deformable section has an average wall thickness which is smaller than a wall thickness of the regions of the plastic bottle which border the longitudinal sides and the wide sides of the at least one unstructured deformable section.

6. The extrusion blow-molded plastic bottle as claimed in claim 5, wherein the at least one unstructured deformable section has a wall thickness which tapers steadily from a maximum wall thickness on the axial longitudinal sides in the direction of a middle section, but does not fall below a minimum wall thickness of 0.02 mm.

7. The extrusion blow-molded plastic bottle as claimed in claim 5, wherein the at least one unstructured deformable section has a wall thickness which tapers steadily in the radial direction from a maximum wall thickness on the wide sides which run in the circumferential direction, but does not fall below a minimum wall thickness of 0.02 mm.

8. The extrusion blow-molded plastic bottle as claimed in claim 1, wherein the at least one unstructured deformable section has a circumferential extension which is 10° to 170°.

9. The extrusion blow-molded plastic bottle as claimed in claim 1, wherein the at least one unstructured deformable section has an axial length which is 15% to 95% of an axial length of the container body.

10. The extrusion blow-molded plastic bottle as claimed in claim 1, comprising:
    two at least one unstructured deformable sections formed and arranged essentially symmetrically to one another on the container body.

11. The extrusion blow-molded plastic bottle as claimed in claim 1, wherein the container body has a cross section which differs from circular.

12. The extrusion blow-molded plastic bottle as claimed in claim 11, wherein the container body has 180° rotational symmetry.

13. The extrusion blow-molded plastic bottle as claimed in claim 1, wherein the container body is made in multiple layers.

14. The extrusion blow-molded plastic bottle as claimed in claim 1, wherein the bottle is made for partial filling with an alcohol-based solvent.

15. The extrusion blow-molded plastic bottle as claimed in claim 1, wherein the container body is made in multiple layers.

16. The extrusion blow-molded plastic bottle as claimed in claim 1, wherein the container body is made in multiple layers.

17. The extrusion blow-molded plastic bottle as claimed in claim 2, wherein the container body is made in multiple layers.

\* \* \* \* \*

UNITED STATES PATENT AND TRADEMARK OFFICE
CERTIFICATE OF CORRECTION

PATENT NO. : 11,111,049 B2
APPLICATION NO. : 14/615983
DATED : September 7, 2021
INVENTOR(S) : Oliver Kies Page 1 of 1

It is certified that error appears in the above-identified patent and that said Letters Patent is hereby corrected as shown below:

On the Title Page

Item (71) Applicant: change:
"ALPLA Werke Alwin Lehner GmbH & Co. KG, Hard (AU);"

To:
-- ALPLA Werke Alwin Lehner GmbH & Co. KG, Hard (AT) --.

Inventor: change:
"Oliver Kies, Hard (AU);"

To:
-- Oliver Kies, Hard (AT) --.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*